United States Patent [19]

Ayabe

[11] Patent Number: 4,682,256

[45] Date of Patent: Jul. 21, 1987

[54] METHOD OF MANUFACTURING A COMPOSITE TYPE MAGNETIC HEAD

[75] Inventor: Yasuhiro Ayabe, Yokohama, Japan

[73] Assignee: Victor Company of Japan, Ltd., Japan

[21] Appl. No.: 791,784

[22] Filed: Oct. 28, 1985

[30] Foreign Application Priority Data

Nov. 1, 1984 [JP] Japan .................. 59-246921

[51] Int. Cl.⁴ .................. G11B 5/23; G11B 5/127; G11B 5/187
[52] U.S. Cl. .................. 360/119; 360/122; 29/603
[58] Field of Search .................. 360/119, 110, 120–122, 360/125–127; 29/603

[56] References Cited

U.S. PATENT DOCUMENTS

| 4,361,860 | 11/1982 | Nozawa ............... | 360/120 |
| 4,559,572 | 12/1985 | Kumasaka et al. ... | 360/110 |

FOREIGN PATENT DOCUMENTS

| 56-124111 | 9/1981 | Japan ............... | 360/122 |
| 56-124112 | 9/1981 | Japan ............... | 360/122 |
| 58-155513 | 9/1983 | Japan . | |
| 59-207415 | 11/1984 | Japan . | |
| 60-606 | 1/1985 | Japan . | |
| 6032107 | 2/1985 | Japan . | |

Primary Examiner—John H. Wolff
Attorney, Agent, or Firm—Andrus, Sceales, Starke & Sawall

[57] ABSTRACT

A composite type magnetic head comprises first and second magnetic head core halves made of a magnetic ferrite, a gap member interposed between the first and second magnetic head core halves, a first narrowed part which is formed on the first magnetic head core half and is narrowed toward the gap member by being defined by first and second curved depressions, a second narrowed part which is formed on the second magnetic head core half and is narrowed toward the gap member by being defined by third and fourth curved depressions, a first film made of a magnetic metal material formed on a surface of the first curved depression, and a second film made of the magnetic metal material formed on a surface of the third curved depression. The first and second films have film thicknesses equal to a desired track width at a part where the first and second films make contact with the gap member and form a gap of the magnetic head.

6 Claims, 12 Drawing Figures

METHOD OF MANUFACTURING A COMPOSITE TYPE MAGNETIC HEAD

BACKGROUND OF THE INVENTION

The present invention generally relates to composite type magnetic heads and manufacturing methods thereof, and more particularly to a composite type magnetic head which is designed to carry out magnetic recording and reproduction with a satisfactory efficiency and a method of manufacturing such a composite type magnetic head.

Generally, a magnetic head which carries out recording and reproduction of a signal with respect to a magnetic recording medium having a high coercive force such as a metal tape must have a high saturation flux density at the time of the recording and a high permeability at the time of the reproduction especially in the high frequency range in order to obtain a sufficient reproducing sensitivity. It is known that a magnetic head having a high saturation flux density is obtainable when a magnetic metal material such as Sendust (registered trademark) and amorphous metals is used to make the magnetic head. On the other hand, it is known that a magnetic head having a high permeability is obtainable when a magnetic ferrite is used to make the magnetic head.

However, in the case of the magnetic head made substantially from the magnetic metal material, it is possible to obtain a satisfactory recording characteristic, but the electrical resistance of the magnetic metal material is small at the time of the reproduction and the permeability accordingly decreases due to the eddy current. As a result, at the time of the reproduction, the deterioration in the permeability is notable especially in the high frequency range, and it is impossible to obtain a satisfactory reproducing characteristic. On the other hand, in the case of the magnetic head made substantially from the magnetic ferrite, it is possible to obtain a satisfactory reproducing characteristic but it is impossible to obtain a satisfactory recording characteristic.

Hence, in order to obtain both a satisfactory recording characteristic and a satisfactory reproducing characteristic, various kinds of composite type magnetic heads have been proposed. In the present specification, a "composite type magnetic head" refers to a magnetic head which is constructed from a magnetic metal material and a magnetic ferrite.

As a first kind of the conventional composite type magnetic head, there is a magnetic head comprising a pair of magnetic head core halves which are made of a magnetic ferrite, as will be described later on in the specification in conjunction with drawings. At a part of the magnetic head where a gap is formed, each magnetic head core half is narrowed to approximately the track width, and a film made of a magnetic metal material is formed on a tip end part of the narrowed part of the magnetic head core half. The pair of magnetic head core halves are bound together with a gap member interposed between the respective magnetic metal films. According to this first kind of the conventional magnetic head, the gap is formed by the magnetic metal films made of the magnetic metal material which makes it possible to obtain a high saturation flux density, but since the film thicknesses of the magnetic metal films are extremely small, the magnetic head at the time of the recording is used in a state near the magnetic saturation. For this reason, there is a disadvantage in that the recording characteristic is not improved notably. In addition, a boundary between the magnetic head core half and the magnetic metal film on the tip end part of the narrowed part of the magnetic head core half is parallel to the gap, and this boundary acts as a pseudo-gap. Hence, there is another disadvantage in that the recording and reproducing characteristics are deteriorated by the pseudo-gap.

On the other hand, as a second kind of the composite type magnetic head, there is a magnetic head also comprising a pair of magnetic head core halves made of a magnetic ferrite, as will be described later on in the specification in conjunction with the drawings, but wherein each magnetic head core half is narrowed to a width less than the track width at a part of the magnetic head where a gap is formed. A film made of a magnetic metal material is formed on an apex part and sloping surfaces of the narrowed part of the magnetic head core half. The pair of magnetic head core halves are bound together with a gap member interposed between the respective magnetic metal films which are formed on the apex parts of the narrowed parts. The magnetic metal films of this magnetic head when viewed from above a contact surface thereof which makes sliding contact with a magnetic recording medium (for example, a magnetic tape), form an approximate X-shape. According to this second kind of the conventional magnetic head, a boundary between the magnetic head core half and the magnetic metal film on the apex part of the narrowed part is not parallel to the gap, and the problem of the pseudo-gap will not occur. The surface of the magnetic metal film on the apex part of the narrowed part is not flat, and this surface is lapped and flattened before binding the pair of magnetic head core halves together. When the surface of the magnetic metal film is lapped, the track width changes, but it is extremely difficult to control the track width to a desired track width. Further, when the contact surface is lapped after the pair of magnetic head core halves are bound together so that the contact surface has a desired curve, the track width changes due to the lapping. As a result, it is extremely difficult to accurately obtain the desired track width. Moreover, since the track width changes when the lapping is performed, the productivity of this magnetic head is poor and the manufacturing cost thereof is high.

SUMMARY OF THE INVENTION

Accordingly, it is a general object of the present invention to provide a novel and useful composite type magnetic head and manufacturing method thereof in which the disadvantages described heretofore are eliminated.

Another and more specific object of the present invention is to provide a composite type magnetic head comprising first and second magnetic head core halves made of a magnetic ferrite, a gap member interposed between the first and second magnetic head core halves, a first narrowed part which is formed on the first magnetic head core half and is narrowed toward the gap member by being defined by first and second curved depressions, a second narrowed part which is formed on the second magnetic head core half and is narrowed toward the gap member by being defined by third and fourth curved depressions, a first film made of a magnetic metal material formed on a surface of the first curved depression, and a second film made of the magnetic metal material formed on a surface of the third curved depression, wherein the first and second films have film thicknesses equal to a desired track width at a part where the first and second films make contact with the gap member and form a gap of the magnetic head. According to the magnetic head of the present invention, it is possible to obtain both a satisfactory recording characteristic and a satisfactory reproducing characteristic. Moreover, it is possible to accurately set the track width of the magnetic head to a desired track width.

Still another object of the present invention is to provide a method of manufacturing a composite type magnetic head comprising a step of forming with a predetermined interval first curved depressions on a first block half made of a magnetic ferrite and second curved depressions on a second block half made of the magnetic ferrite, a step of forming a first film made of a magnetic metal material on each of the first curved depressions and a second film made of the magnetic metal material on each of the second curved depressions, a step of filling a glass sealing in the first and second curved depressions on top of the first and second films, a step of lapping surfaces of the first and second block halves which constitute gap surfaces, a step of forming third curved depressions on the first block half adjacent to the first curved depressions so that the first film is exposed for a predetermined range in a vicinity of the gap surface and fourth curved depressions on the second block half adjacent to the second curved depressions so that the second film is exposed for the predetermined range in a vicinity of the gap surface, a step of forming a block by binding the first and second blocks together with a gap member interposed between the gap surfaces so that the film thicknesses of the first and second films coincide at parts where gaps of magnetic heads are formed, and a step of slicing the block into a plurality of magnetic heads. According to the manufacturing method of the present invention, it is possible to manufacture with a satisfactory productivity composite type magnetic heads which have the track widths thereof accurately set to a desired track width and have both a satisfactory recording characteristic and a satisfactory reproducing characteristic.

Other objects and further features of the present invention will be apparent from the following detailed description when read in conjunction with the accompanying drawings.

DETAILED DESCRIPTION

Figure 1A:
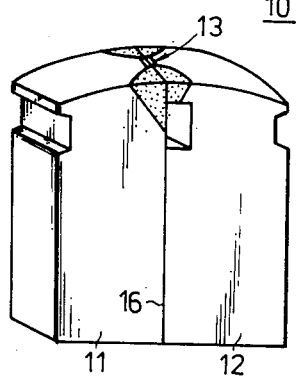
FIGS. 1A and 1B are a perspective view and an enlarged partial plan view respectively showing an example of a conventional composite type magnetic head.
Figure 1B:
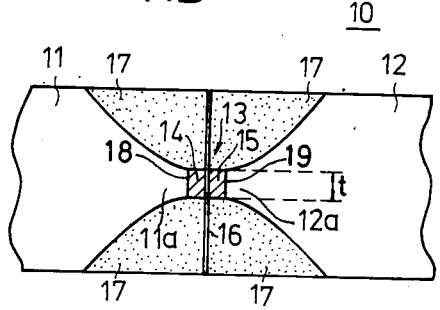

First, description will be given with respect to an example of the conventional composite type magnetic head by referring to FIGS. 1A and 1B. A magnetic head 10 comprises a pair of magnetic head core halves 11 and 12 which are made of a magnetic ferrite. An illustration of a coil will be omitted in FIG. 1A. The core halves 11 and 12 respectively have narrowed parts 11a and 12a which are narrowed approximately to a track width t toward a gap part 13, and films 14 and 15 made of a magnetic metal material are respectively formed on tip end parts of the narrowed parts 11a and 12a. The core halves 11 and 12 are bound together with a gap member 16 interposed between the films 14 and 15. A glass sealing 17 fills cutout parts which are formed by the provision of the narrowed parts 11a and 12a.

However, according to the conventional magnetic head 10, a gap is formed by the films 14 and 15 made of the magnetic metal material which makes it possible to obtain a high saturation flux density, but since the film thicknesses of the films 14 and 15 are extremely small, the magnetic head 10 at the time of the recording is used in a state near the magnetic saturation. For this reason, there is a disadvantage in that the recording characteristic is not improved notably. In addition, a boundary 18 between the core half 11 and the film 14 on the tip end part of the narrowed part 11a of the core half 11 is parallel to the gap, and a boundary 19 between the core half 12 and the film 15 on the tip end part of the narrowed part 12a of the core half 12 is parallel to the gap. These boundaries 18 and 19 act as pseudo-gaps. Hence, there is another disadvantage in that the recording and reproducing characteristics are deteriorated by the pseudo-gaps.

Figure 2A:
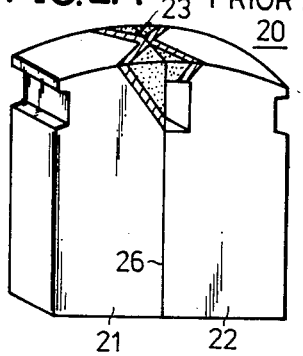
FIGS. 2A and 2B are a perspective view and an enlarged partial plan view respectively showing another example of a conventional composite type magnetic head.
Figure 2B:
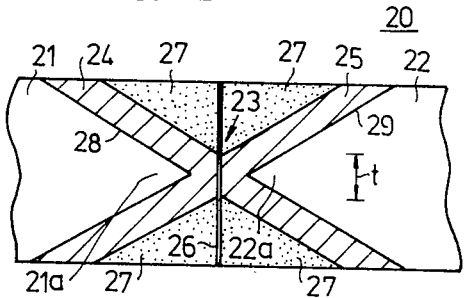

On the other hand, another example of the conventional composite type magnetic head is shown in FIGS. 2A and 2B. This kind of the conventional composite type magnetic head is disclosed in a Japanese Laid-Open Pat. Application No. 58-155513, for example. A magnetic head 20 comprises a pair of magnetic head core halves 21 and 22 which are made of a magnetic ferrite. An illustration of a coil will be omitted in FIG. 2A. The core halves 21 and 22 respectively have narrowed parts 21a and 22a which are narrowed to a width which is smaller than the track width t toward a gap part 23, and films 24 and 25 made of a magnetic metal material are respectively formed on apex parts and sloping surfaces of the narrowed parts 21a and 22a. The core halves 21 and 22 are bound together with a gap member 26 interposed between the films 24 and 25 on the apex parts. A glass sealing 27 fills cutout parts which are formed by the provision of the narrowed parts 21a and 22a.

According to the conventional magnetic head 20, a boundary 28 between the core half 21 and the film 24 on the apex part of the narrowed part 21a is not parallel to the gap, and a boundary 29 between the core half 22 and the film 25 on the apex part of the narrowed part 22a is not parallel to the gap. Hence, the problem of the pseudo-gaps will not occur. The surfaces of the films 24 and 25 on the apex parts of the respective narrowed parts 21a and 22a are not flat, and these surfaces are lapped and flattened before binding the core halves 21 and 22 together. When the surfaces of the films are lapped, the track width changes, but it is extremely difficult to control the track width to a desired track width. Further, when a contact surface which makes sliding contact with a magnetic recording medium (not shown) is lapped after the core halves 21 and 22 are bound together so that the contact surface has a desired curve, the track width changes due to the lapping also. As a result, it is extremely difficult to accurately obtain the desired track width because the track width changes before and after the core halves 21 and 22 are bound together. Moreover, since the track width changes when the lapping is performed, the productivity of the magnetic head 20 is poor and the manufacturing cost thereof is high.

It is possible to modify the construction of the magnetic head 20 so that the track width will not change by the lapping which is performed after the core halves 21 and 22 are bound together. However, in this case, the reproducing efficiency becomes poor since the reluctance of the back gap becomes large.

In FIGS. 1A, 1B, 2A, 2B and the figures which follow, the film thickness of the film and the width of the gap are shown on an enlarged scale compared to other parts of the magnetic head for convenience' sake so that the construction of the magnetic head can be understood with ease.

Figure 3A:
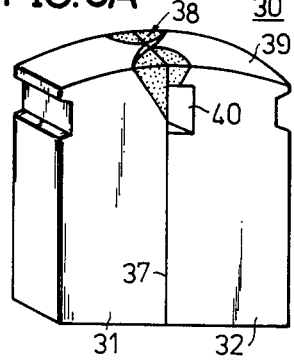
FIGS. 3A and 3B are a perspective view and an enlarged partial plan view respectively showing an embodiment of the composite type magnetic head according to the present invention.
Figure 3B:
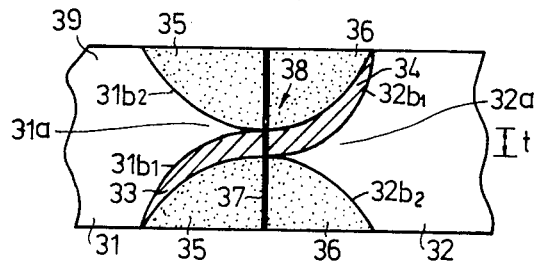

The present invention eliminates the disadvantages of the conventional magnetic heads described heretofore, and description will now be given with respect to an embodiment of the composite type magnetic head according to the present invention by referring to FIGS. 3A and 3B. A magnetic head 30 is suited for use on a video tape recorder, for example. The magnetic head 30 generally comprises a pair of magnetic head core halves 31 and 32 which are made of a magnetic ferrite, films 33 and 34 made of a magnetic metal material, glass sealings 35 and 36, and a gap member 37. The core halves 31 and 32 respectively have narrowed parts 31a and 32a which are narrowed toward a gap part 38. The narrowed part 31a interposes a pair of curved depressions 31b1 and 31b2, and the narrowed part 32a interposes a pair of curved depressions 32b1 and 32b2. The film 33 is formed on a surface of one curved depression 31b1, and the film 34 is formed on a surface of one curved depression 32b1. In the present embodiment, the films 33 and 34 are made of an alloy in Fe-Si-Al system and are formed by a sputtering process. However, the method of forming the films 33 and 34 is not limited to the sputtering process, and other methods such as a deposition method may be used. Further, the magnetic metal material used for the films 33 and 34 is not limited to the alloy in Fe-Si-Al system, but other magnetic metal materials having a high saturation flux density such as an amorphous alloy in Co-Zr system may be used. The film thicknesses of the films 33 and 34 are equal to the track width t at the gap part 38, and the track width t is selected in a range of 15 μm to 22 μm, for example.

For example, a low-melting glass is used for the glass sealings 35 and 36. The glass sealing 35 is filled into the one curved depression 31b1 on top of the film 33 and in the other curved depression 31b2, and the film 33 is protected by the glass sealing 35. Similarly, the glass sealing 36 is filled into the one curved depression 32b1 on top of the film 34 and in the other curved depression 32b2, and the film 34 is protected by the glass sealing 36. Accordingly, when a contact surface 39 of the magnetic head 30 for making sliding contact with a magnetic recording medium (not shown) such as a magnetic tape is lapped so as to obtain a desired curve, the films 33 and 34 will not be damaged by the lapping process.

A hole 40 is provided in the core half 32 so as to wind a coil (not shown) thereon.

The core halves 31 and 32 are bound together with the gap member 37 interposed between the films 33 and 34 by a binding agent such as a low-melting glass, in a state where the films 33 and 34 coincide in the film thickness direction thereof. The gap member 37 is a quartz film, for example. Accordingly, the magnetic head 30 in the vicinity of the gap part 38 thereof is constituted solely by the films 33 and 34. In addition, on the contact surface 39, the films 33 and 34 extend in an approximate S-shape when viewed from above the contact surface 39. Hence, a boundary between the core half 31 and the film 33 on the surface of the curved depression 31b1 of the core half 31 is not parallel to the gap, and a boundary between the core half 32 and the film 34 on the surface of the curved depression 32b1 of the core half 32 is also not parallel to the gap. Therefore, the boundaries will not act as pseudo-gaps, and it is possible to carry out satisfactory recording and reproduction with low noise. Further, since the films 33 and 34 are formed on the surfaces of the respective curved depressions 31b1 and 32b1 over a large range, there will be no magnetic saturation in the vicinity of the gap part 38, and the magnetic head 30 is suited for use with a magnetic recording medium (for example, a metal tape or the like used in video tape recorders) having a high coercive force.

Next, description will be given with respect to an embodiment of the method of manufacturing the composite type magnetic head according to the present invention by referring to FIGS. 4 through 9. In FIGS. 4 through 9, those parts which are the same as those corresponding parts in FIGS. 3A and 3B will be designated by the same reference numerals.

Figure 4:
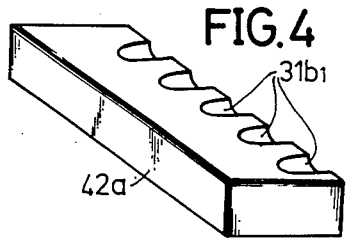
FIGS. 4 through 9 show block halves for explaining an embodiment of the method of manufacturing the composite type magnetic head according to the present invention.
Figure 5:
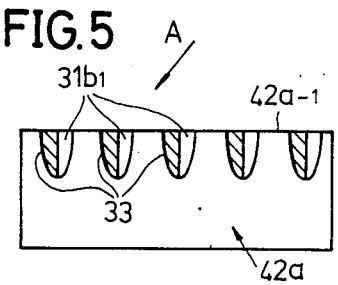

FIG. 4 shows a magnetic ferrite block half 42a. Since another magnetic ferrite block half 42b which constitutes a block 45 together with the block half 42a is the same as the block half 42a and is subjected to the same processes as the block half 42a, description will only be given with respect to the processes which are performed on the block half 42a, and description on the other block half 42b will be omitted.

A plurality of first curved depressions 31b1 are formed on the top surface of the block half 42a with a predetermined interval as shown in FIG. 4. The separation between two adjacent first curved depressions 31b1 is selected so that a second curved depression 31b2 having approximately the same configuration as the first curved depressions 31b1 can be formed between the two adjacent first curved depressions 31b1 in a later process.

Next, the film 33 made of the magnetic metal material such as an alloy in Fe-Si-Al system or an amorphous alloy in Co-Zr system is formed on the surface of each of the first curved depressions 31b1 of the block half 42a by a method such as sputtering and deposition. The sputtering or the like is performed in an oblique direction A with respect to a surface 42a-1 of the block half 42a so that the film 33 is formed over approximately half the total surface of each of the first curved depressions 31b1 as indicated by hatchings in FIG. 5. The film thickness of the film 33 is selected so that the film thickness is equal to the desired track width at the part of the surface 42a-1 where the gap is formed. The surface 42a-1 is the surface which constitutes the gap surface, and is the top surface in FIG. 4.

Figure 6:
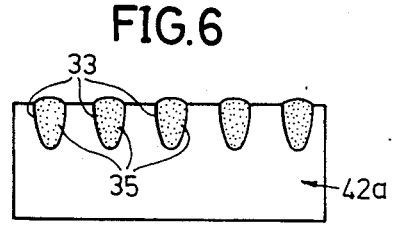
Figure 7:
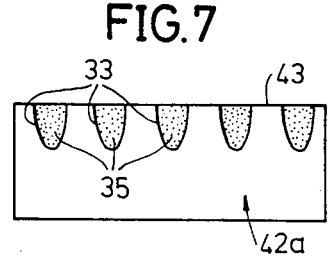

The glass sealing 35 such as the low-melting glass is filled into each of the first curved depressions 31b1 on top of the film 33 as shown in FIG. 6. Thereafter, processes such as forming holes and grooves for the coil (not shown) on the block half 42a are performed. Further, the excess glass sealing 35 is removed and the surface 42a-1 is lapped so as to obtain the block half 42a shown in FIG. 7 having a gap surface 43. Because the film 33 is held in place and is protected by the glass sealing 35, the film 33 will not be damaged during the processes in which the holes and grooves for the coil are formed on the block half 42a and the surface 42a-1 is lapped.

Figure 8:
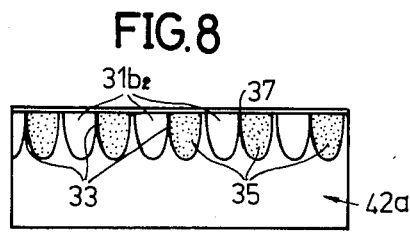

Next, as shown in FIG. 8, the second curved depressions 31b2 are formed adjacent to corresponding first curved depressions 31b1 so as to expose the films 33 for a predetermined range in the vicinity of the gap surface 43. Even when the film 33 is exposed for the predetermined range in the vicinity of the gap surface 43, the remaining part of the film 33 is still positively held in place and is protected by the glass sealing 35, and the film 33 will not separate from the block half 42a. When exposing the film 33 for the predetermined range in the vicinity of the gap surface 43, it is possible to slightly chip the film 33 in the film thickness direction thereof intentionally so as to obtain the desired track width. The gap member 37 which is a quartz film, for example, is formed on the gap surface of one of the block halves 42a and 42b. In the present embodiment, the gap member 37 is formed on the gap surface 43 of the block half 42a as shown in FIG. 8.

Figure 9:
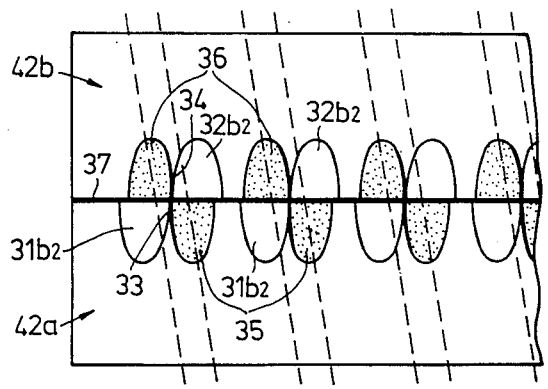

The pair of block halves 42a and 42b which are formed by the processes described heretofore, are bound together by use of a binding agent such as a low-melting glass to form the block 45 shown in FIG. 9. The block halves 42a and 42b are bound together so that the film thicknesses of the films 33 and 34 coincide at the gap surfaces (gap part 38) with the gap member 37 interposed between the gap surfaces.

Next, the glass sealings 35 and 36 are filled into the respective curved depressions 31b2 and 32b2, and the contact surface 39 is lapped to obtain the desired curve. Thereafter, the block 45 is sliced into a plurality of composite type magnetic heads 30 having the construction shown in FIGS. 3A and 3B, for example. It is possible to slice the block 45 obliquely along phantom lines in FIG. 9 when the gap part 38 is to have an azimuth angle. The block 45 can be sliced along lines perpendicular to the gap surface when the gap part 38 does not need to have an azimuth angle.

According to the present embodiment, it is possible to manufacture with a high productivity the composite type magnetic head 30 which has both a satisfactory recording characteristic and a satisfactory reproducing characteristic and introduces low noise since no pseudo-gaps are formed.

Further, the present invention is not limited to these embodiments, but various variations and modifications may be made without departing from the scope of the present invention.

What is claimed is:

1. A method of manufacturing a composite type magnetic head having a contact surface for scanning a magnetic recording medium, said method comprising:
a step of forming, with a predetermined interval, first curved depressions on a first block half made of a magnetic ferrite and second curved depressions on a second block half made of the magnetic ferrite;
a step of forming a first film made of a magnetic metal material directly on at least a portion of each surface of the first curved depressions and a second film also made of said magnetic metal material directly on at least a portion of each surface of the second curved depressions;
a step of filling a glass sealing in the first and second curved depressions on top of the first and second films;
a step of lapping gap surfaces of the first and second block halves, said first and second films respectively having film thicknesses equal to a desired track width at said gap surfaces of the first and second block halves;
a step of forming third curved depressions on the first block half adjacent to the first curved depressions so that the first film is exposed for a predetermined range in a vicinity of the gap surface and fourth curved depressions on the second block half adjacent to the second curved depressions so that the second film is exposed for the predetermined range in a vicinity of the gap surface;
a step of forming a block by binding the first and second block halves together with a gap member interposed between the gap surfaces so that the film thicknesses of the first and second films coincide with each other to form a gap of the magnetic head at the contact surface, said first and second films constituting a generally S-shaped contour at the contact surface which includes said gap of the magnetic head; and
a step of slicing the block into a plurality of magnetic heads.

2. A method as claimed in claim 1 in which said step of forming the first and second films forms the first and second films by a sputtering process.

3. A method as claimed in claim 2 in which said step of forming the first and second films forms the first and second films by a process of sputtering an alloy in Fe-Si-Al system.

4. A method as claimed in claim 2 in which said step of forming the first and second films forms the first and second films over approximately half the respective surfaces of the first and second curved depressions by a process of sputtering the magnetic metal material in an oblique direction to the gap surfaces.

5. A method as claimed in claim 1 in which said step of forming the third and fourth curved depressions chips the first and second films for said predetermined range in the film thickness direction so that the film thicknesses of the first and second films are equal to the desired track width at the part where the gap of the magnetic head is formed.

6. A method as claimed in claim 1 which further comprises before said step of slicing the block a step of filling a glass sealing in said third and fourth curved depressions and a step of lapping said contact surface which makes sliding contact with a magnetic recording medium.

* * * * *